United States Patent [19]

Kallies et al.

[11] Patent Number: 5,316,241

[45] Date of Patent: May 31, 1994

[54] AIRCRAFT DOOR LIFTING AND DOOR HINGE SWIVELLING MECHANISM

[75] Inventors: Guenter Kallies; Wolfgang Lessat-Kaupat, both of Hamburg, Fed. Rep. of Germany

[73] Assignee: Deutsche Aerospace Airbus GmbH, Hamburg, Fed. Rep. of Germany

[21] Appl. No.: 6,232

[22] Filed: Jan. 19, 1993

[30] Foreign Application Priority Data

Jan. 16, 1992 [DE] Fed. Rep. of Germany ....... 4200930

[51] Int. Cl.$^5$ .............................................. B64C 1/14
[52] U.S. Cl. ................... 244/129.5; 49/254; 16/243; 16/248
[58] Field of Search ............... 244/129.5, 118.5, 137.2; 49/254–257; 16/235, 242, 243, 248

[56] References Cited

U.S. PATENT DOCUMENTS 3,791,073 2/1974 Baker ............................. 244/129.5
4,497,462 2/1985 Hamatani ........................... 49/254

FOREIGN PATENT DOCUMENTS 637243 2/1962 Canada ........................... 244/129.5
1551821 9/1979 United Kingdom ............. 244/129.5

OTHER PUBLICATIONS

Kasper, European Patent Application #0105082, Nov. 4, 1984.

*Primary Examiner*—Galen L. Barefoot
*Attorney, Agent, or Firm*—W. G. Fasse; W. F. Fasse

[57] ABSTRACT

An aircraft door is supported by at least two support rods. Each rod rests with one of its ends in a door hinge that is rotatable with the support rod through an angle of, for example 90°, while the door can be shifted up or down along the support rods. For this purpose a torque shaft which is rotatably mounted to the door frame is connected through toggle devices to the other end of the respective support rod, whereby rotation of the torque shaft lifts or lowers the door relative to the support rods. The same torque shaft is connected to the support rods through a linkage device, including a bellcrank lever for rotating the support rods simultaneously with the lifting or lowering of the door relative to the support rods, whereby the hinges can be moved from a recessed position inside the door structure when the door is closed into an extended position outside the door structure for opening the door.

8 Claims, 3 Drawing Sheets

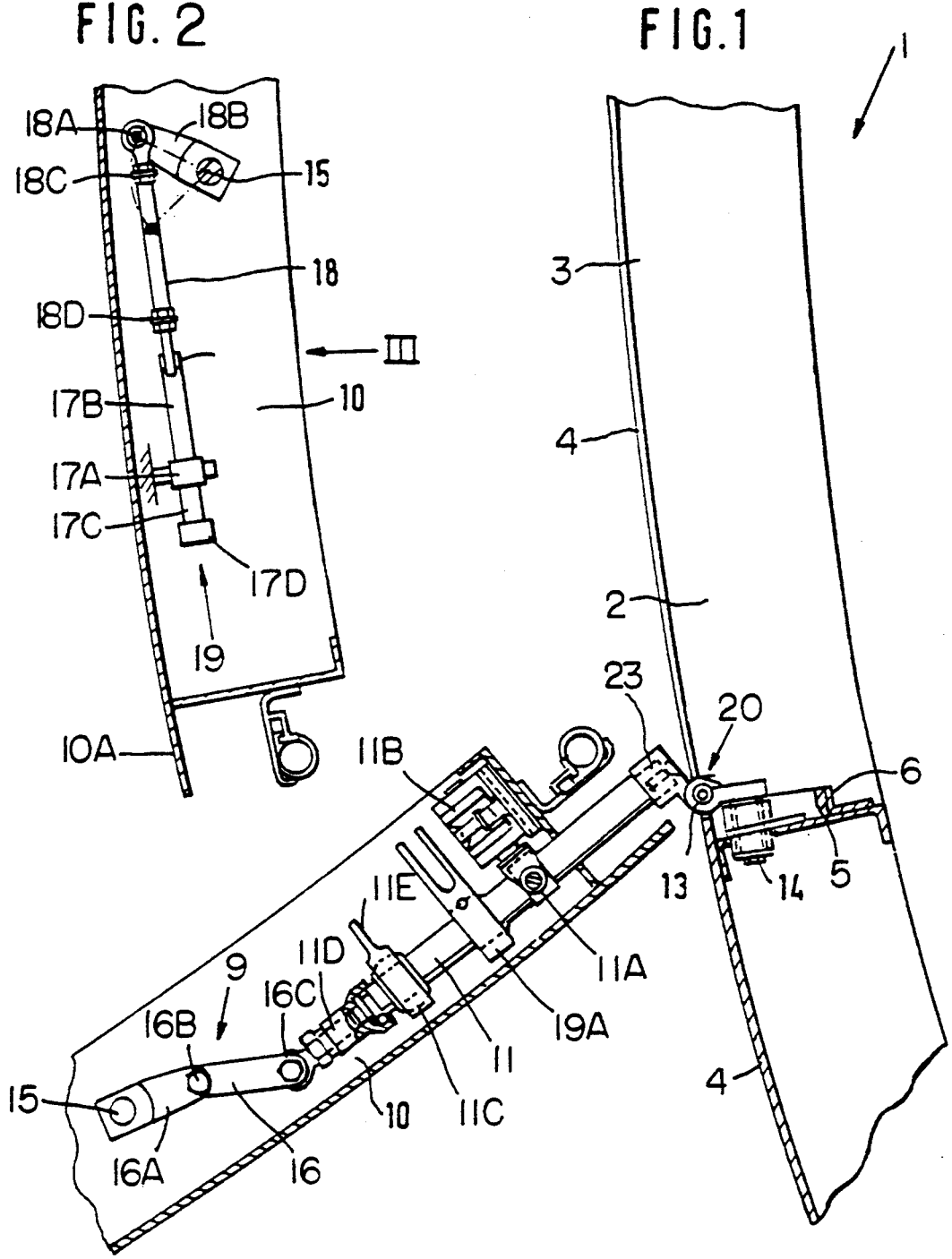

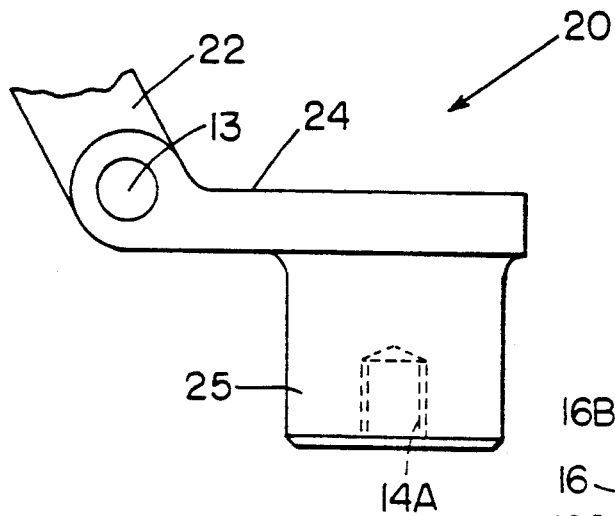
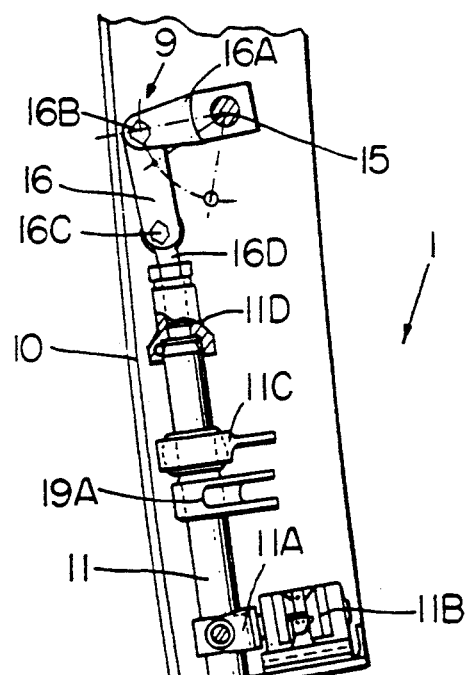
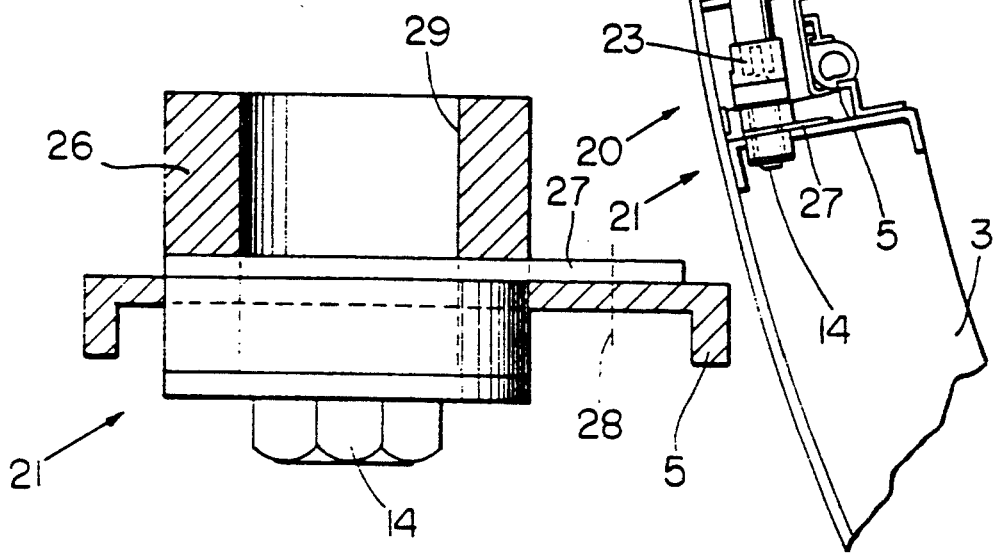

1

AIRCRAFT DOOR LIFTING AND DOOR HINGE SWIVELLING MECHANISM

FIELD OF THE INVENTION

The invention relates to a door lifting and door hinge swivelling mechanism for an aircraft, particularly smaller aircraft. Doors of this type must be lifted before they can be opened.

BACKGROUND INFORMATION

Mechanisms for the lifting of doors, especially aircraft doors, are known in various modifications which are frequently adapted to the particular requirements of a specific door. Such doors must be able to seal the interior of an aircraft against the exterior for the proper pressurization of the aircraft during flight. Special hardware connected to the door and to the aircraft body structure is used for the locking and lifting of the door and for then tilting the door outwardly once it has been sufficiently lifted. Hinges for aircraft doors must be, necessarily, arranged inside the aircraft body structure when the door is closed. Thus, these hinges of conventional construction limit the door opening angle. On the one hand, it is desirable to open such doors to an optimal extent. On the other hand, it is necessary to avoid adverse collisions between the door and the aircraft body or between the door and an aircraft wing.

OBJECTS OF THE INVENTION

In view of the foregoing it is the aim of the invention to achieve the following objects singly or in combination:

to construct the hardware for a door that needs to be lifted before it can be opened, especially an aircraft door, in such a way that a single operation, such as the tilting of a door handle, will simultaneously sufficiently lift the respective door, and tilt the door hinges outwardly outside the confines of the aircraft body to permit the proper opening of the door;

to use the rotation of a shaft for both purposes, namely lifting the door and swivelling the door hinges; and to mount the door to support rods in such a manner that the support rods are rotatable or swivellable about their longitudinal axis while simultaneously an axial force is applied to the support rods for lifting the door.

SUMMARY OF THE INVENTION

According to the invention, the present door lifting and door hinge swivelling mechanism is characterized by at least two support rods to which the door is movably mounted by slide bearings. A torque transmitting shaft that is rotatably mounted to the door is also connected to a door handle. Torque converting first link elements connect the torque transmitting shaft to the support rods for lifting the door relative to the support rods by converting the torque of the rotating shaft into an axially effective lifting force. Second link means connect the torque transmitting shaft and the support rods for rotating the support rods in response to the torque applied by the torque transmitting shaft. The rotation or swivelling of the support rods is through an angular range which may be rather limited, for example, 90°. Door hinges are connected to the support rods, preferably at one end thereof, and the door hinges are rotatably supported in respective hinge support elements connected to the aircraft frame structure, such as a door sill. The just mentioned 90° swivelling of the support rods is sufficient for bringing the hinges inside the door structure when the door is closed, and tilting the hinges outside the door structure when the door is to be opened.

BRIEF DESCRIPTION OF THE DRAWINGS

In order that the invention may be clearly understood, it will now be described, by way of example, with reference to the accompanying drawings, wherein:

FIG. 1 is a sectional view perpendicularly to the longitudinal aircraft axis through the present mechanism showing the door in its opened condition;

FIG. 2 is a view approximately in the direction of the arrow II in FIG. 3;

FIG. 8 is a view similar to that of FIG. 1, but showing the door in its closed condition;

FIG. 9 is a side view of first and second hinge sections of which the second section forms a mounting foot for the respective hinge and support rod; and FIG. 10 shows a second socket connected to the aircraft frame for receiving the hinge foot shown in FIG. 9.

Figure 3:
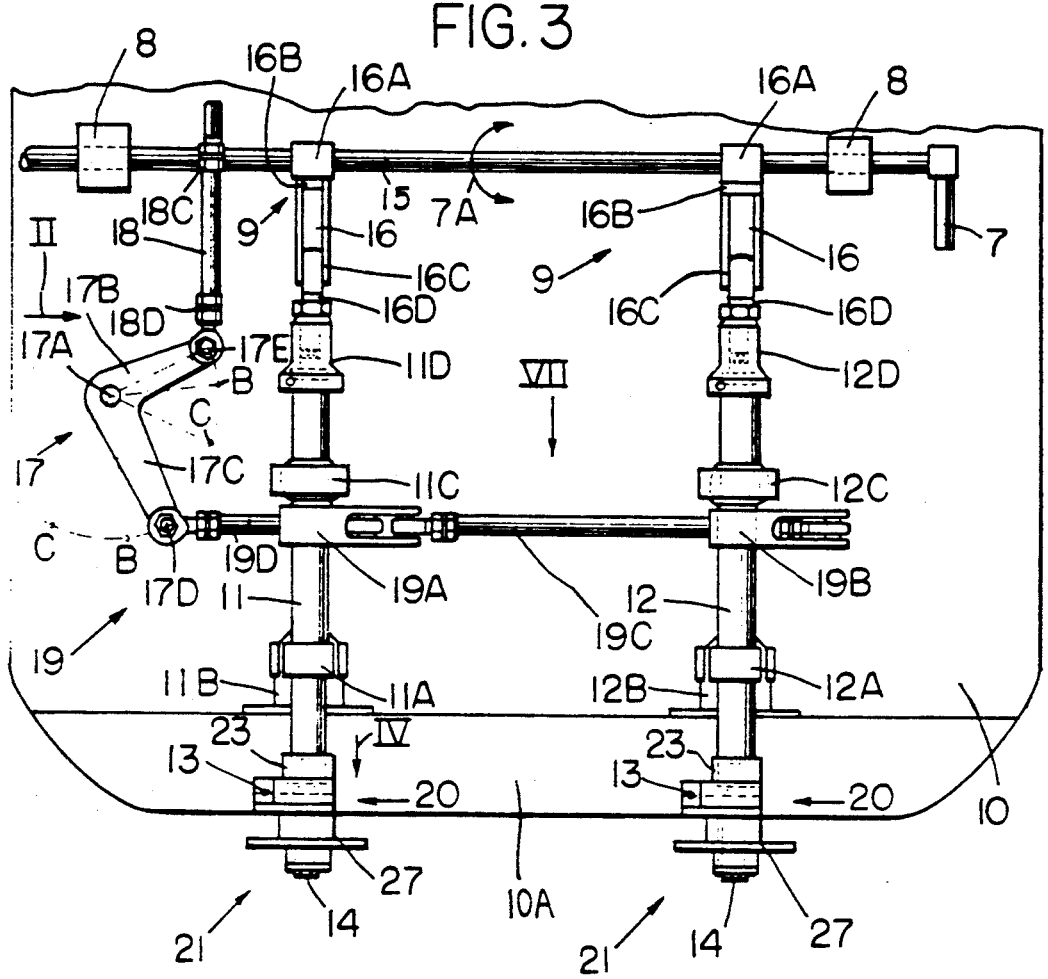
FIG. 3 is a view into the door in its closed condition, approximately in the direction of the arrow III in FIG. 2.
Figure 4:
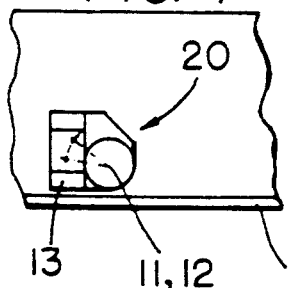
FIG. 4 is a view in the direction of the arrow IV in FIG. 3, showing the hinge inside the door when the door is closed.

DETAILED DESCRIPTION OF A PREFERRED EXAMPLE EMBODIMENT AND OF THE BEST MODE OF THE INVENTION

FIG. 1 shows a broken away portion of an aircraft body 1 having a door opening 2 surrounded by a door frame 3 covered by the body skin 4. A door sill 5 is rigidly secured to the frame 3. A sealing member 6 is mounted to the door sill 5.

FIG. 1 shows the aircraft door 10 in an open condition. A toggle device 9 has lifted the door 10 along its support rods 11 and 12. Both support rods 11 and 12 are seen in FIG. 3. The door 10 is mounted to both support rods by slide bearings 11A and 12A secured to the door frame by bearing blocks 11B and 12B respectively. Further slide bearings 11C and 12C are provided for properly guiding the door up and down along the rods 11 and 12 respectively. The guide bearings 11C and 12C are also secured to the door frame as shown at 11E in FIG. 1.

Referring further to FIGS. 1, 2, and 3 in conjunction, a torque transmitting shaft 15 is rotatably mounted to the door frame by bearings 8 shown in FIG. 3. A door handle 7 is rigidly secured to the torque transmitting shaft 15 for rotating the shaft 15 as indicated by the arrow 7A.

The above mentioned toggle device 9 forms a first torque converting link connected between the shaft 15 and the door supporting rods 11 and 12 for lifting the door relative to the support rods. The toggle device 9 lifts the door up and lowers it down, depending on the operation of the door handle 7. For this purpose, each toggle device has a first arm 16 and a second arm 16A. The second arm 16A is rigidly connected to the shaft 15 for converting the torque of the shaft into a substantially axially effective force for lifting and lowering the door. The free end of the toggle arm 16A is journalled at 16B to the first toggle arm 16 which in turn is journalled at 16C to a coupling rod 16D. The coupling rod 16D is in turn connected through a respective swivel joint 11D, 12D to the upper end of the respective rod 11, 12. When the shaft 15 turned clockwise, the door is lowered, when the shaft 15 is turned counterclockwise, the door is lifted relative to the rods 11 and 12 which remain stationary in the axial direction, but which are simultaneously rotated through a limited angular range as will now be described.

Figure 7:
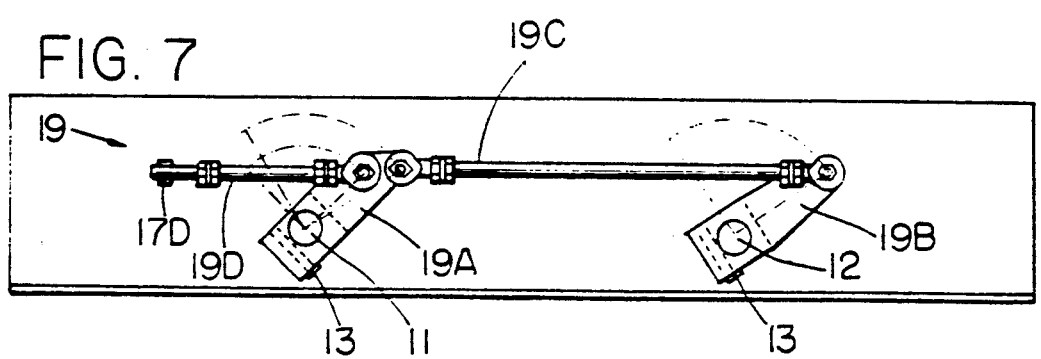
FIG. 7 is a view in the direction of the arrow VII in FIG. 3.

Referring specifically to FIGS. 2, 3, and 7, the torque transmitting link 19 comprises several coupling rods 18, 19C, and 19D as well as a bellcrank 17 and torque arms 19A and 19B. The upper end of the rod 18 is journalled at 18A to a further torque arm 18B rigidly connected to the torque transmitting shaft 15. The lower end of the rod 18 is journalled at 17E to one arm 17B of a bellcrank lever 17, which itself is journalled at 17A to the door frame. The other downwardly reaching arm 17C of the bellcrank 17 is journalled at 17D to a linking rod 19D.

The just described torque transmitting second link 19 rotates the support rods 11 and 12 through an angular range of about 90° around a longitudinal axis of these support rods 11, 12 as will now be described with reference to FIGS. 3, 4, 5, and 6. In the position of the bellcrank 17 shown in FIG. 3, the door hinges 20 assume the position shown in FIG. 4 with the hinge entirely within the door frame and inside the door skin 4A. In this condition the door is closed.

Figure 5:
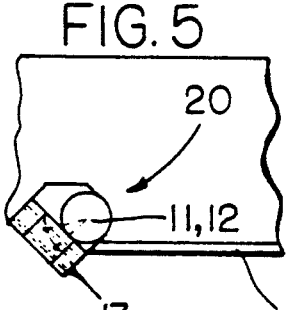
FIG. 5 is a view similar to that of FIG. 4, but showing the hinge on its way partially out of the confines of the door.
Figure 6:
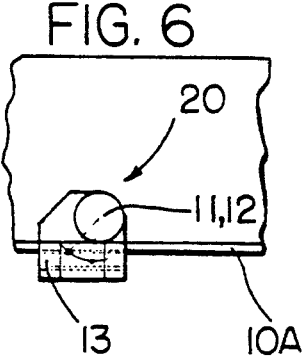
FIG. 6 is a view similar to that of FIGS. 4 and 5, but showing the hinge swivelled out of the confines of the door when the door is opened or can be opened.

If the bellcrank 17 is now rotated clockwise about its journal 17A, from position A shown in full lines to position B, the rods 11, 12 will rotate to bring the hinges into the position shown in FIG. 5. Further clockwise rotation of the bellcrank 17 into the position C will bring the hinge pin 13 into the position shown in FIG. 5, whereby the door can now be opened as shown in FIG. 1.

A separate toggle device 9 is provided for each support rod 11 and 12. However, the second link device for transmitting the torque from the shaft 15 to both rods comprises a single transmission train as just described, except for the torque transmitting levers 19A and 19B provided separately for each rod 11 and 12.

Referring to FIGS. 1, 3, 8, 9 and 10, the door hinges 20 will now be described. These hinges 20 rest rotatably on hinge supports 21. Each hinge 20 comprises a first hinge section 22 carrying a first socket 23 and a second hinge section 24 carrying a hinge foot 25. The socket 23 is shown in FIGS. 1, 3, and 8. The lower end of the respective support rod 11, 12 is received in and rigidly secured to the respective socket 23. The second hinge section 24 rests with its foot 25 in a second socket 26 of the hinge supports 21. The hinge supports 21 have a flange 27 which is rigidly secured to the socket 26 and rests, for example, on the door sill 5 to which the flange 27 is secured by screws symbolically shown at 28. The foot 25 rests rotatably in a cavity 29 of the socket 26. Further, the foot 25 is secured by a screw 14 engaging a threaded hole 14A in the foot 25. The screw connection is such, that the foot 25 can freely rotate within the cavity 29 through the required angular range of, for example, 90°. The screw 14 makes sure that the foot 25 cannot escape axially out of its cavity 29 while still permitting the respective support rod 11, 12 to rotate about its longitudinal axis while axial pressure is applied to the support rods for lifting the door while such pressure is relieved when lowering the door. FIG. 1 shows the hinge 20 positioned at the lower vertical end of the door 10. However, the hinges may also be positioned at the upper door end so that rather than opening the door downwardly, the door may be opened upwardly.

Further, adjustment devices are provided in the torque transmitting devices. For example, both ends of the rod 18 are adjustably connected to their respective pivots as shown at 18C and 18D in FIGS. 2 and 3. Additional, threaded adjustment devices are illustrated in FIG. 3. For example, the swivel joints 11D and 12D are adjustably connected to their respective coupling member 16D.

Although the invention has been described with reference to specific example embodiments, it will be appreciated that it is intended to cover all modifications and equivalents within the scope of the appended claims.

What we claim is:

1. An aircraft door lifting and door hinge swivelling mechanism, comprising an aircraft door, at least two door support rods, slide bearings for movably mounting said door to said support rods, a torque transmitting shaft rotatably mounted to said door and connected to a door handle, torque converting first link means connected between said torque transmitting shaft and said support rods for lifting said door relative to said support rods, torque transmitting second link means connected between said torque transmitting shaft and said support rods for rotating said support rods through an angular range about a longitudinal axis of each of said support rods, door hinges connected to said support rods, and means for rotatably supporting each of said door hinges, whereby said door hinges are inside said aircraft door when said door is closed and outside said door when said door is opened.

2. The mechanism of claim 1, wherein said torque converting first link means comprise a toggle device for each support rod, pivot means securing said toggle device to one end of the respective support rod, and means rigidly securing said toggle device to said torque transmitting shaft, whereby rotation of said torque transmitting shaft lifts said door through said toggle device.

3. The mechanism of claim 2, wherein said pivot means securing said toggle device to one end of the respective support rod comprise a swivel joint in which said one end of the respective support rod is rotatably received and a pivot member connecting said toggle device to said swivel joint, whereby said support rod is rotatable about its longitudinal axis while axial pressure is applied to the support rod for lifting said door.

4. The mechanism of claim 1, wherein said torque transmitting second link means comprise a bellcrank having first and second arms, a journal journalling said bellcrank to said door, first link means operatively connecting said first arm of said bellcrank to said torque transmitting shaft, second link means operatively connecting said second arm of said bellcrank to said support rods, whereby rotation of said torque transmitting shaft rotates said support rods through said angular range.

5. The mechanical of claim 4, wherein said angular range is about 90°.

6. The mechanism of claim 1, wherein each of said door hinges comprises a first hinge section forming a first socket in which one end of the respective support rod is secured, a second hinge section forming a foot, a hinge pin hinging said first and second hinge sections to each other, and wherein said means for rotatably supporting each of said door hinges comprising a rigidly mounted second socket in which said foot is received.

7. The mechanism of claim 6, wherein said hinge pin extends horizontally and wherein said aircraft door is tiltable into an open and down or up position through an angle of more than 90°.

8. The mechanism of claim 6, wherein said second socket is mounted to a door sill of an aircraft.

* * * * *